United States Patent [19]
von Bonin et al.

[11] Patent Number: 5,194,198
[45] Date of Patent: Mar. 16, 1993

[54] PROCESS FOR THE PRODUCTION OF MOULDED ARTICLES OF EXPANDED GRAPHITE

[75] Inventors: Wulf von Bonin, Odenthal; Ulrich von Gizycki, Leverkusen; Klaus Krüger, Bergisch Gladbach, all of Fed. Rep. of Germany

[73] Assignee: Bayer Aktiengesellschaft, Leverkusen, Fed. Rep. of Germany

[21] Appl. No.: 699,871

[22] Filed: May 14, 1991

[30] Foreign Application Priority Data

May 24, 1990 [DE] Fed. Rep. of Germany ....... 4016710

[51] Int. Cl.$^5$ ................... B29C 67/20; B29C 67/24
[52] U.S. Cl. ................................. 264/42; 264/41
[58] Field of Search .......................... 264/41, 42

[56] References Cited

U.S. PATENT DOCUMENTS

| | | | |
|---|---|---|---|
| 3,333,941 | 8/1967 | Olstowski et al. | 264/42 |
| 3,389,964 | 6/1968 | Olstowski | 264/42 |
| 3,414,381 | 12/1968 | Olstowski et al. | 264/42 |
| 3,853,972 | 12/1974 | Berner | 264/101 X |
| 3,877,080 | 4/1975 | Olcott | 264/42 X |
| 3,885,007 | 5/1975 | Olsen et al. | 264/42 |
| 3,928,520 | 12/1975 | Shinomoto et al. | 264/42 |
| 4,075,114 | 2/1978 | Ishikawa et al. | 264/42 X |
| 4,102,960 | 7/1978 | Borkowski | 264/42 |
| 4,146,401 | 3/1979 | Yamada et al. | 264/42 X |
| 4,777,000 | 10/1988 | Kuwabara et al. | 264/101 X |
| 4,929,404 | 5/1990 | Takahashi et al. | 264/101 X |

FOREIGN PATENT DOCUMENTS

| 4119 | 1/1975 | Japan | 264/42 |
|---|---|---|---|
| 2011361 | 7/1979 | United Kingdom. | |

*Primary Examiner*—Karen Aftergut
*Attorney, Agent, or Firm*—Sprung, Horn, Kramer & Woods

[57] ABSTRACT

Moulded articles are produced by heating expandable graphite, in which the expandable graphite is first pre-expanded at 140° to 450° C. until a bulk density of 30 to 500 g/l has been reached, at least 50% by volume of a mould is then filled with the graphite thus pre-expanded, and the expansion of the graphite is then completed in the mould by heating to temperatures in the range from 300° to 700° C.

8 Claims, No Drawings

PROCESS FOR THE PRODUCTION OF MOULDED ARTICLES OF EXPANDED GRAPHITE

The present invention relates to a process for the production of moulded articles made of expandable graphite.

Expandable graphites are graphite compounds which contain components, for example $NO_x$ or $SO_x$ incorporated in the interstitial layers, which upon liberation confer expandability. Expandable graphites are sometimes also called graphite salts. They can be prepared, for example, by treating graphite with strong acids, for example fuming nitric acid and/or fuming sulphuric acid.

Expandable graphites are commercially available. In general they have bulk densities around 600 g/l. When heated to temperatures generally above 150° C., more advantageously above 200° C., they expand to many times their volume, with the release of, for example, $NO_x$ or $SO_x$ with expansion of the planar layers.

If it is desired to produce moulded articles from expandable graphite in a more or less closed mould, expandable graphite powder for example in the form of flakes, is poured into the mould and then heated, as a result of which the foaming graphite fills out the mould and is compressed therein. However, even simple but in particular more complicated moulds are found not to be filled out uniformly by the expanding graphite. At the central portions at which the expandable graphite was present at the beginning of foaming, density and compressive strength of the moulded article formed are high but low in peripheral regions, because the expandable graphite penetrates peripheral regions only with difficulty.

A process for the production of moulded articles by heating expandable graphite powder in moulds has now been found which is characterised in that first a graphite powder is pre-expanded by controlled heating at temperatures between 140° and 450° C. until a bulk density of 30 to 500 g/l has been reached, at least 50% by volume of the moulds are filled with the graphite pre-expanded in this manner, and the expansion of the graphite is then completed by heating at temperatures in the range from 300° to 700° C.

Examples of suitable expandable graphite powder are expandable $SO_x$ or expandable $NO_x$ graphite or mixtures thereof. The expandable graphite powder can be present for example, in the form of flakes which have, for example, an average surface area diameter of at least 0.1 mm. Preferably, this surface area diameter is 0.2 to 5 mm, in particular 0.5 to 3 mm. Expandable graphite powders of larger particle diameters than 5 mm are also quite suitable for moulds having relatively large clearances while expandable graphite powders having smaller diameters than 0.1 mm are in general less expandable.

The expandable graphite powder is preferably used in a mixture with at least one binder. The binder or binders can be admixed to the graphite before or after the pre-expansion. It is preferred to admix the binder before the pre-expansion.

Examples of suitable binders are tars, bitumen or organic polymers and preferably phosphoric acid donors, in particular amine phosphates, metal hydrogen phosphates, amine phosphonates and metal hydrogen phosphonates which melt at 150° to 600° C. with foaming. Secondary ammonium phosphate, ethylenediamine phosphate, aluminium methylphosphonate, calcium methylphosphonate, magnesium methylphosphonate and zinc methylphosphonate are particularly preferred. It is also possible to use mixtures of different binders.

Binders can be used, for example, in amounts of 0 to 85% by weight, relative to the finished moulded articles. This amount is preferably 5 to 35% by weight.

The expandable graphite can also be used, if appropriate in addition to binders, in combination with fillers, carbon fibres and/or inorganic fibres.

The preferred temperatures for the pre-expansion are between 160° and 350° C. The pre-expansion is continued until the expandable graphite has a bulk density between 30 and 500 g/l, preferably between 40 and 250 g/l, particularly preferably between 50 and 150 g/l.

Preferably, 75 to 100% by volume of the moulds for the production of the moulded articles is filled with the pre-expanded graphite, if appropriate together with the binders described and/or additives.

The moulds are preferably substantially closed or substantially closeable moulds, i.e. moulds which do not or only insignificantly change their geometry upon completion of the expansion of the graphite, which are, however, not gastight.

The moulded articles are finished by heating the moulds, at least 50% by volume of which is filled with pre-expanded graphite and, if appropriate, binders and/or additives, at temperatures between 300° and 700° C. Temperatures between 450° and 600° C. are preferred here. The heat can be supplied to the mould in various ways, for example by heating the mould from outside, by induction, by passing through heating gas, by radiation or by exposure to microwaves.

The pre-expansion of the graphite which may contain binders and/or additives can also be carried out in the mould, although it is preferably carried out outside thereof, for example in an oven or a fluidized bed, in which the heating can take place, for example, by heat conduction, passing in heating gases, microwaves, high-frequency fields, induction or radiation.

The pre-expanded graphite can, if desired, be stored in between for a longer period of time before moulded articles are produced therefrom.

Moulded articles produced according to the invention are ductile, have a low density, good conductivity for heat and electric current, good heat resistance (for example to more than 1,500° C.) and can, if desired, be given an oxidation-resistant finish, for example by means of phosphorus-containing binders. The specific weight of the ductile moulded articles obtainable according to the invention, which can be produced, for example, in the form of slabs, profiles, half-shells, pipes, sound-proof elements or moulded articles having a more complicated geometry, is in general between 0.02 and 0.5 g/cm³, preferably between 0.05 and 0.4 g/cm³, in particular between 0.08 and 0.3 g/cm³. The specific weight of the moulded articles can be varied, for example, by more or less complete filling of the particular mould with material containing pre-expanded graphite and/or by varying the bulk density of this material. High bulk densities of the pre-expanded graphite material result in high specific weights of the finished moulded articles.

Surprisingly, moulded articles produced according to the invention are substantially homogeneous with respect to density and compressive strength. Even more complicated moulds are filled uniformly with expanded graphite. Furthermore, it is surprising that pre-expanded graphites, when reheated in the mould, can still lead to a solid composite and thus good strength of the moulded article. It was also surprising that the pre-expanded mould fillings have sufficient heat conduction in the interior for homogeneous re-expansion, even if the mould is only heated from the outside. Finally, it was surprising that expandable graphite once pre-expanded remains expandable even after a longer period of storage, although its lattice planes have already been expanded during the pre-expansion, and the expanding gases would therefore be expected to get lost during storage.

Moulded articles produced according to the invention can be used, for example, in areas where non-flammable mechanical, thermal or electromagnetic shields, soundproof elements, floor heating elements, other heating elements having good heat conductivity in combination with low weight or flame barriers are required, for example in engine construction, in rocket construction, in automotive body construction, heating plant construction and in space technology.

EXAMPLES

EXAMPLE 1

For Comparison

A mould made of sheet steel for a pipe half-shell having a wall thickness of 1 cm and a volume of 1,000 ml was used. The expandable graphite used was a commercially available $NO_x$ expandable graphite. The expandable graphite was impregnated with an aqueous salt solution obtained from 1 mol of aluminium hydroxide and 3 mol of methylphosphonic acid and dried at 120° C.. This gave an expandable graphite material containing 30% by weight of phosphonate. It was ground to give granules having an average particle diameter of 3 mm.

100 g of granules were introduced into the horizontal half-shell mould which was lined with aluminium foil, and the granules were uniformly distributed along the middle generator of the half cylinder. The mould was then placed into an oven pre-heated to 600° C., heated at a constant temperature of 600° C. for 30 minutes, removed from the oven and cooled.

A moulded article had been formed which filled only about 65% by volume of the mould. The filling had not been able to rise completely by expansion at both sides of the generator of the half cylinder of the mould and to fill the mould completely. The resulting incomplete half cylinder (pipe half-shell) had considerably higher densities and strengths along the middle generator than on the edges.

EXAMPLE 2

The impregnated dried and ground expandable graphite material which was also used in Example 1 was first heated in an open pot at 200° C. with gentle agitation until its bulk density was 100 g/l. 100 g of the material thus pre-expanded were then poured into the upright half-shell mould which was also used in Example 1 with shaking, as a result of which the mould became completely filled. The mould was then heated at 600° C. in a preheated oven for 30 minutes. After cooling, a uniformly constructed and complete pipe half-shell was removed from the mould. The heat transfer number of the material was 7 W/K×m, the density 0.1 g/cm³, and the indentation hardness 20 kg/cm². The fire classification according to DIN 4102 was found to be A2, and the smoke density according to ATS specification 1000.001, 1984, was 0. The sound insulation according to NSA specification No. 65-6 and US Mil-Std. 285 was above 80 db in the S band and also in the X band.

EXAMPLE 3

The procedure of Example 2 was repeated, except that expandable graphite material which had been pre-expanded at 188° C. to a bulk density of 200 g/l was used, giving a very stable pipe half-shell of homogeneous appearance, which had a density of about 0.2 g/cm³.

EXAMPLE 4

The procedure of Example 2 was repeated, except that a commercially available $SO_x$ expandable graphite was used which had been impregnated with 20% by weight of a phosphate obtained by neutralisation of an aqueous solution of ethylenediamine with orthophosphoric acid. This expandable graphite combination was pre-expanded at 220° C. to a bulk density of 100 g/l and gave a pipe half-shell of mechanically homogeneous appearance.

EXAMPLE 5

A mixture of $SO_x$ expandable graphite and $NO_x$ expandable graphite (weight ratio 1:1; bulk density 80 g/l) was thoroughly mixed with finely ground secondary ammonium phosphate in a weight ratio of 7:3. 125 g of this mixture was poured into the mould also used in Example 1. The mould was then heated at 600° C. for 30 minutes, giving a moulded article of homogeneous appearance which had a density of 0.11 g/cm³.

EXAMPLE 6

Commercially available $NO_x$ expandable graphite was pre-expanded at 330° C. until it had a bulk density of 50 g/l. This material was used to fill a mould according to Example 1 which was lined with writing paper, and a moulded article was produced by heating the mould at 600° C. for 50 minutes. A very light pipe half-shell having an indentation hardness of 8 kg/cm² and a density of 0.05 g/cm³ was obtained.

Half-shells as obtained according to Examples 2 to 6 can be used for covering exhaust pipes.

EXAMPLE 7

A glass tube made of borosilicate apparatus glass having an inner clearance of 2.5 cm was coated with a mixture of 10% by weight of talcum powder and 90% by weight of a 1% strength carboxymethylcellulose solution in water on the inside and thoroughly dried. This coating served as release agent. The 25 cm long tube was then filled with $NO_x$ graphite pre-expanded to a bulk density of 90 g/l, sealed on both sides with a sintered glass crucible and placed into a conventional 600 watt microwave oven switched to full power for 5 minutes. After cooling, a compact piston consisting of expanded and compacted graphite was pushed out of the glass tube. The piston formed had a density of 0.095 g/cm³ and an indentation hardness of 12 kg/cm².

As in all other cases mentioned, the indentation hardness was determined by placing a planar cylinder having a bottom area of 0.25 cm² on the test specimen, and the load in gram necessary for pushing the cylinder 5 mm deep into the specimen was measured. By conversion, the corresponding value was obtained in kg/cm².

EXAMPLE 8

A steel mould in the form of slabs was used which made it possible to produce slabs having a thickness of 2.5 cm. The mould was completely filled up to its filling volume with expandable graphite material which had been pre-expanded to a bulk density of 110 g/l and otherwise was used as in Example 2, and the mould was sealed. It was then heated in an induction oven at 600° C. for 15 minutes. After cooling, a slab having a homogeneous density distribution of 0.1±0.02 g/cm³ was removed.

EXAMPLE 9

6 parts by weight of commercially available $NO_x$ expandable graphite were thoroughly mixed with 1 part by weight of glass fibres (commercially available "milled fibres") and 3 parts by weight of a salt obtained from 1 mol of aluminium hydroxide and 3 mol of orthophosphoric acid and 1 part by weight of hydrargillite. The mixture was then made into a kneadable paste with water. After thorough kneading, the paste was dried at 50° C. and comminuted to give particles having a particle size of about 3 mm in diameter. These granules were pre-expanded at 200° C. to a bulk density of 140 g/l, and a pipe half-shell was then produced in a mould according to Example 1 by heating at 600° C. The pipe half-shell was mechanically very stable and had an average homogeneously distributed density of 0.13 g/cm³.

What is claimed is:

1. A process for the production of moulded articles having substantially homogeneous density and compressive strength by heating expandable graphite powder in moulds, in which process first the expandable graphite powder is pre-expanded outside the moulds by controlled heating at temperatures between 140° and 450° C. until a bulk density of 30 to 500 g/l has been reached, second at least 50% by volume of the moulds are filled with the graphite powder which was pre-expanded in this manner, and third the expansion of the pre-expanded graphite powder is then completed in the moulds by heating at temperatures in a range of from 300° to 700° C. to cause the pre-expanded graphite powder to uniformly fill the moulds and thus produce the moulded articles having the substantially homogeneous density and compressive strength.

2. The process of claim 1, in which the expandable graphite powder used is $SO_x$ expandable graphite or $NO_x$ expandable graphite or mixtures thereof in a form of flakes having an average surface diameter of at least 0.1 mm.

3. The process of claim 1, in which the expandable graphite powder forms a mixture with at least one binder.

4. The process of claim 1, in which a binder is mixed with the expandable graphite powder which binder comprises phosphoric acid donors.

5. The process of claim 1, in which up to 85% by weight of binder, relative to the produced moulded articles, is mixed with the expandable graphite powder.

6. The process of claim 1, in which expandable graphite powder is used in combination with one or more additives selected from the group consisting of fillers, carbon fibres and inorganic fibres.

7. The process of claim 1, in which 75 to 100% by volume of the moulds for the production of the moulded articles are filled with the pre-expanded graphite powder.

8. The process of claim 1, in which the pre-expansion is carried out at 160° to 350° C. and the production of the moulded articles at 450° to 600° C.

* * * * *